United States Patent [19]
Winkler

[11] 3,790,117
[45] Feb. 5, 1974

[54] AUXILIARY REAR VIEW MIRROR

[76] Inventor: Charles Winkler, 21 Devon St., Malverne, N.Y. 11565

[22] Filed: May 8, 1972

[21] Appl. No.: 251,175

[52] U.S. Cl.............. 248/481, 248/226 B, 350/304
[51] Int. Cl............................................... B60r 1/04
[58] Field of Search..248/226 B, 476, 479, 481, 482 248/483, 484, 485; 350/299, 303, 304

[56] References Cited
UNITED STATES PATENTS

| | | | |
|---|---|---|---|
| 3,048,084 | 8/1962 | Januzzi | 248/483 X |
| 1,046,479 | 12/1912 | McPherson | 248/226 B X |
| 2,636,419 | 4/1953 | Kerr | 350/304 |
| 1,435,310 | 11/1922 | Kipper | 248/482 X |

Primary Examiner—William H. Shultz

[57] ABSTRACT

An auxiliary rear view mirror in which a mirror is pivoted on one end of an arm whose other end forms a stationary clamp member that telescopically guides a cooperating clamp member formed with integral means for retaining it on the stationary clamp member; the two clamp members are engageable over opposed edges of a main rear view mirror and are movable towards one another to adjust the space between them for fitting over main rear view mirrors of varying sizes.

5 Claims, 5 Drawing Figures

PATENTED FEB 5 1974 3,790,117
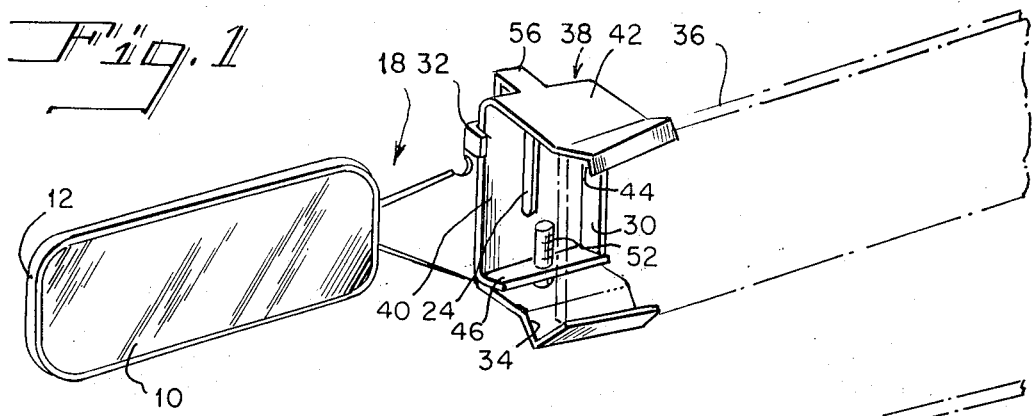
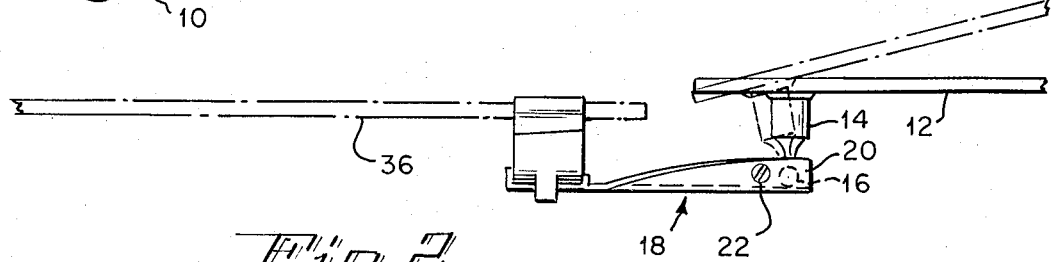
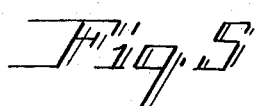
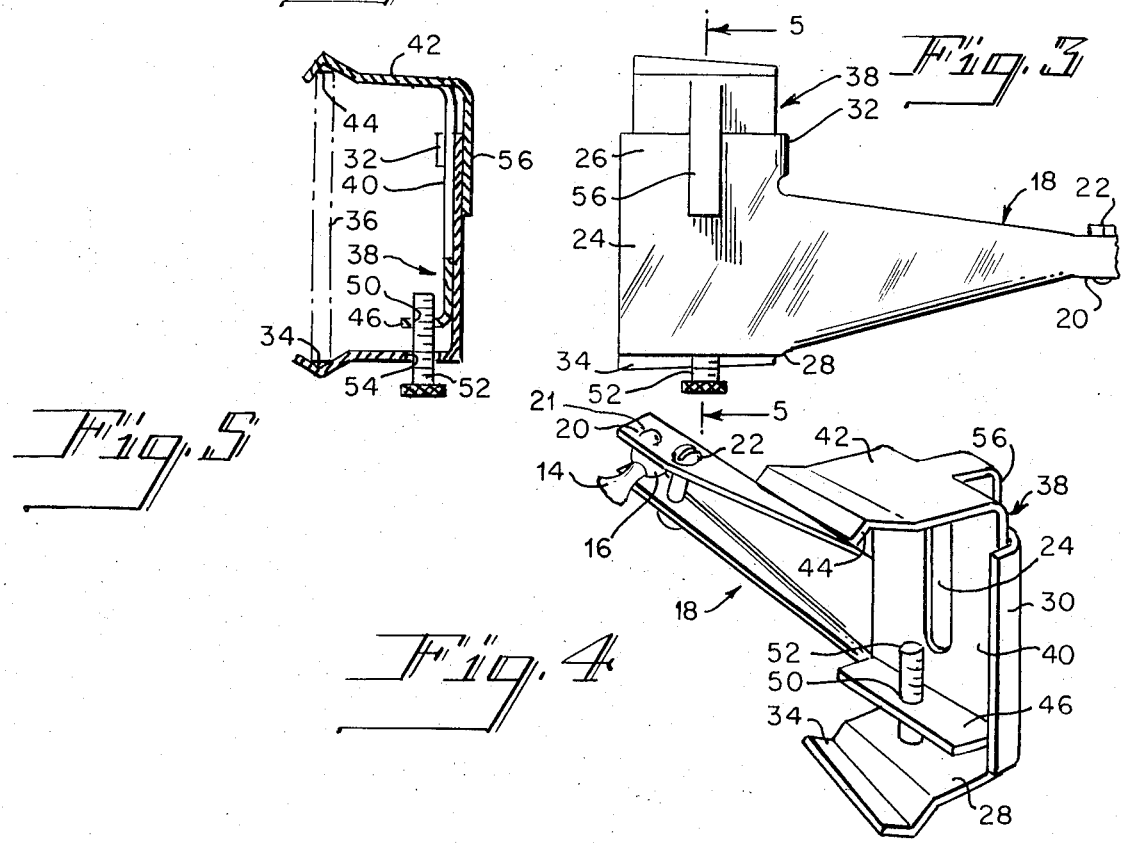
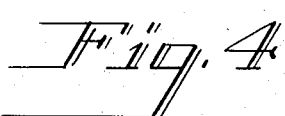

AUXILIARY REAR VIEW MIRROR

The present invention relates to an auxiliary rear view mirror for vehicles, and has for its primary object to provide such mirror which will eliminate "blind spots" that prevent the driver of the vehicle from obtaining a complete view of the roadway behind his own vehicle.

Various rear view devices for motor vehicles to eliminate blind spots have heretofore been contemplated. However, such devices have not been completely satisfactory for various reasons. Some of these devices have not been readily adjustable to the convenience of the individual driver. Others have been relatively complicated and costly to manufacture, as by being integrally connected to the main rear view mirror, and did not afford any option for the driver whether to use it or not. While yet others had to be "tailor-made" for the specific size and shape of the main rear view mirror and, therefore, were not economically feasible to market because of the great variety in the size and shape of main rear view mirrors used in vehicles.

The present invention is directed to the provision of an auxiliary rear view mirror which eliminates all of the foregoing drawbacks.

Thus, the present invention has for its object to provide an auxiliary rear view mirror which is separate and apart from the main rear view mirror and may be removably mounted on main rear view mirrors of different sizes and shapes, and, thus transferred from vehicle to vehicle.

It is another object of the present invention to provide an auxiliary rear view mirror, of the character described, which may be readily and easily adjusted for safe and secure mounting on mirrors of varying sizes and shapes.

It is also an object of the present invention to provide an auxiliary rear view mirror, of the character described, which may be readily and easily adjusted, independently of the main rear view mirror, to the convenience of the individual driver, to eliminate blind spots to his rear that are individual to him.

It is a further object of the present invention to provide an auxiliary rear view mirror, of the character described, which is of relatively simple and sturdy construction and economical to produce.

The foregoing and other objects and advantages of the auxiliary rear view mirror of the present invention will become more readily apparent to those skilled in the art from the embodiment thereof shown in the accompanying drawings and from the description following. It is to be understood, however, that such embodiment is shown by way of illustration only, to make the principles and practice of the invention more readily comprehensible, and without intent of limiting the invention to the specific details therein shown.

In the drawings:

FIG. 1 is a front perspective view of one embodiment of an auxiliary rear view mirror of the present invention;

FIG. 2 is a top edge view of the same;

FIG. 3 is a fragmentary, rear view of the mirror supporting arm and clamp of the auxiliary rear view mirror of the present invention;

FIG. 4 is a view similar to that of FIG. 1, as seen from the other end; with the mirror omitted; and FIG. 5 is a section taken on line 5—5 of FIG. 3.

Generally stated, the present invention contemplates the provision of an auxiliary rear view mirror which is mounted by a universal joint on one end of an arm, whose other end constitutes the stationary part of a two-piece telescoping clamp that are adjustably guided and held on one another to engage between them opposed edges of main rear view mirrors of varying sizes and shapes, and which may be fixed on one another in adjusted position.

Referring now in greater detail to the embodiment of the invention illustrated in the drawing, the auxiliary rear view mirror is shown to comprise a mirror or glass reflector 10, of any desirable shape, mounted on or held in a preferably metallic back plate 12, to which is secured the outwardly projecting pin 14, having an enlarged spherical end 16, which may form the ball of a ball and socket joint.

The socket for the joint is formed at the end of an arm, generally designated as 18, comprising a flat strip of metal whose one end is folded into U-shape, as at 20, between the parallel sides of which, within dimples 21, the ball, 16, is engaged. The sides of the U-shaped end 20 of arm 18, may be tightened against ball 16 by means of a screw or bolt, 22, set into an opening in one of the sides and whose end is engaged in a threaded opening in the other sides of the folded end 20 of arm 18, or by a nut in a manner that will be readily understood.

Arm 18 is gradually flattened out from its folded end 20, and its flat other end 24 is upwardly enlarged as at 26 and downwwardly enlarged as at 28; the lower enlargement being preferably of substantial length and both enlargements being preferably of rectangular shape.

The end of flat section 24, at the other end of arm 18, has a flange, 30, which is offset in the same direction as the sides of the U-shaped end 20 and the inner edge of the upper enlargement 26 is provided with a flange 32, that is, likewise, offset in the same direction. The lower enlargement 28 is offset in the same direction as flange 30 and is creased transversely adjacent its outer edge to form an upwardly facing, preferably V-shaped channel, 34.

The end section 24 of arm 18, together with the lower enlargement 28, form the fixed member of an adjustable clamp by which the mirror 10 may be secured to opposed edge portions of a main rear view mirror, indicated by the broken lines at 36. The adjustable, cooperating portion of the clamp comprises a strip of metal, or the like, generally designated as 38, having a substantially rectangular central portion 40, of a width to fit between and be guided by flanges 30 and 32. Strip section 40 is provided with an upper extension, 42, offset to overlie extension 32 when in position between flanges 28 and 30, and preferably provided with a transverse crease forming a downwardly open V-shaped channel, 44. The lower end of the strip section 40 is likewise formed with an extension, 46, offset in the same direction as extension 42 and substantially parallel thereto and of relatively lesser length so as to terminate short of the channel 34 in extension 28 when in position. Lower extension 46 is formed with a threaded opening, 50, engageable by the adjusting screw, 52, which passes from below through a corresponding, vertically alined opening, 54, formed in extension 28.

Section 40 of strip 38 has struck out therefrom, vertically therealong, a bar 56 whose upper end is connected to extension 42; its connected end being upwardly offset to be in substantial alignment with extension 42 for a distance equal to the thickness of section 24 of arm 18, and is adapted to overlie the outer surface of end section 24 of arm 18 when the adjustable clamp portion 38 is positioned between flanges 30 and 32, thereby serving as a guard for maintaining clamp portion 38 in place.

It will be apparent that the auxiliary rear view mirror of the present invention may be readily and easily fabricated and assembled; the spherical end 16 at the end of pin 14 projecting from back plate 12 of mirror 10 being placed between the sides of end 20 of arm 18 and tightened in position by the turning of the screw or bolt 22; the adjustable clamp member 38 being arranged in place by sliding its portion 40 over the end 24 of arm 18, between flanges 30 and 32, with bar 56 engaging over the exterior thereof, to retain it in place. The clamp may be held in assembled position by the adjusting screw, 52, and bar 56. The assembled auxiliary mirror may be readily secured to the main rear view mirror 36 by having channels 34 and 44 fitted over opposed edges of the mirror 36 and tightened in place by the adjusting screw 52.

This completes the description of the auxiliary rear view mirror of the present invention and the manner of its use. It will be readily apparent that such auxiliary rear view mirror is of relatively simple construction and simple and economical to manufacture. It will also be apparent that it may be simply, and securely mounted in place over rear view mirrors of different sizes and shapes and that, when mounted, may be readily and easily adjusted in position for reflecting to the driver of a vehicle various locations at his rear, thereby enabling the driver to eliminate blind spots that are individual to him.

It will be further apparent that numerous variations and ramifications in the auxiliary rear view mirror of the present invention may be made by anyone skilled in the art, in accordance with the principles of the invention hereinabove set forth and without the exercise of any inventive ingenuity.

What we claim is:

1. An auxiliary rear view mirror device comprising a mirror, a supporting arm for said mirror, cooperating means on the back of said mirror and one end of said arm forming a universal pivot for said mirror on said arm; a fixed clamp member integral with the other end of said arm and a cooperating clamp member telescopically movable on said fixed clamp member, said clamp members adapted to engage opposed edge portions of a main rear view mirror; means on said fixed clamp member guiding said movable clamp member in its telescopic movement thereon; means on said movable member slidably engaging said fixed clamp member for retaining said movable clamp member on said fixed clamp member as it is telescopically moved thereon; and means inter-engaging said clamp members for adjustably moving and setting said movable clamp member on said fixed clamp member; wherein said universal pivot includes a pin projecting from the back of said mirror, said pin carrying a ball at its end and a substantially flat strip of flexibly rigid material, folded into U-shape at said one end of said arm, said ball disposed between the sides of said folded arm end; and wherein the other end of said arm has its marginal edge portion offset to form a flange, said other end of said arm having extensions projecting from opposed edges thereof, one of said extensions offset in the direction of said folded sides, the other of said extensions having a flange projecting from its inner edge offset in the direction of said marginal edge portion, said movable clamp member guided between said flanges.

2. The auxiliary rear view mirror of claim 1, wherein said movable member comprises a substantially flat strip of rigid material having a central portion of a width adapted to fit and be guided between said flanges, said central portion having an upper end portion offset laterally relative thereto and adapted to overlie said fixed clamp element in spaced relation thereto, when said central portion is disposed between said flanges and to form a cooperating movable clamp arm therewith, said central portion having a lower end portion offset relative thereto and adapted to overlie said fixed clamp arm, and inter-engageable therewith for adjustable movement of said second clamp arm relative to said fixed clamp arm.

3. The auxiliary rear view mirror of claim 2, wherein said means on said movable member, slidably engaging said arm, comprises a bar struck out from said central portion thereof, said bar having its connected end upwardly offset to align with said upper offset end a distance equal to the thickness of said strip; the lower portion of said bar disposed in parallel to said central portion.

4. The auxiliary rear view mirror of claim 2, wherein the lower offset end of said central portion is formed with a threaded opening and said fixed clamp arm is formed with an opening in vertical alignment with said threaded opening, and a headed screw is passed through said opening in said fixed clamp arm and is threadedly engaged in said threaded opening.

5. The auxiliary rear view mirror of claim 1, including means for adjustably pressing the sides of said folded end against said ball.

* * * * *